(12) United States Patent
Furukawa

(10) Patent No.: US 9,128,186 B2
(45) Date of Patent: Sep. 8, 2015

(54) TARGET TRACKING DEVICE AND TARGET TRACKING METHOD

(75) Inventor: Hidetoshi Furukawa, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 627 days.

(21) Appl. No.: 13/403,353

(22) Filed: Feb. 23, 2012

(65) Prior Publication Data

US 2012/0221274 A1 Aug. 30, 2012

(30) Foreign Application Priority Data

Feb. 25, 2011 (JP) .................................. 2011-040363

(51) Int. Cl.
*G01S 13/66* (2006.01)
*G01S 13/72* (2006.01)
*G01S 13/68* (2006.01)

(52) U.S. Cl.
CPC ...................................... *G01S 13/68* (2013.01)

(58) Field of Classification Search
CPC ..................... G06F 17/00; G06F 17/10–17/11; G06F 17/16–17/18; G01S 13/00; G01S 13/02; G01S 13/0218; G01S 13/04; G01S 13/06; G01S 13/50; G01S 13/58; G01S 13/588; G01S 13/589; G01S 13/64; G01S 13/66; G01S 13/68; G01S 13/70; G01S 13/72; G01S 13/88; G01S 13/885; G01S 2205/00
USPC ......... 702/94, 33, 95, 97, 127, 143, 149–151, 702/155, 158–159, 189, 196; 342/73, 342/95–96, 104, 106–109, 118; 703/2
See application file for complete search history.

(56) References Cited

FOREIGN PATENT DOCUMENTS

| JP | 7-128436 | 5/1995 |
|---|---|---|
| JP | 2002-181926 | 6/2002 |
| JP | 2009-38777 | 2/2009 |
| JP | 2011-47881 | 3/2011 |

OTHER PUBLICATIONS

Chen et al., Track Association and Fusion with Heterogeneous Local Trackers, Dec. 12-14, 2007, Proceedings of the 46th IEEE Conference on Decision and Control, New Orleans, LA, pp. 2675-2680.*
D. Howard, et al., "Tracking Radar", Radar Handbook, $2^{nd}$ ed., ch. 18, ed. M. Skolnik, McGraw-Hill, New York, 1990, 1 page.
Takashi Yoshida, "Radar Technology (Revised Edition)", The Institute of Electronics, Information and Communication Engineers, 1996, 7 pages, (with Partial English Translation).

(Continued)

*Primary Examiner* — Toan Le
(74) *Attorney, Agent, or Firm* — Oblon, McClelland, Maier & Neustadt, L.L.P.

(57) ABSTRACT

According to one embodiment, target tracking device includes track calculator and correction unit. Track calculator calculates a track of a target based on angular measurement of the target measured by a passive sensor. Correction unit sends correction data to the track calculator. Correction unit calculates correction data based on state vector of target input from an external device. Track calculator calculates track for each of a plurality of motion models based on angular measurement and correction data. Track calculator calculates the track of the target based on the track for each of the motion models. Track calculator calculates the track of the target by weighted sum of all tracks for the motion models.

14 Claims, 9 Drawing Sheets

(56) References Cited

OTHER PUBLICATIONS

Y. Bar-Shalom, et al., "Estimations with Applications to Tracking and Navigation", Wiley-Interscience, 2001, 2 pages.

Masayoshi Ito, et al., "Tracking a 3-dimensional Moving Target with Distributed Passive Sensors Using Extended Kalman Filter", IEICE Transactions (B), vol. J82-B, No. 5, May 1999, 7 pages, (with Partial English Translation).

\* cited by examiner

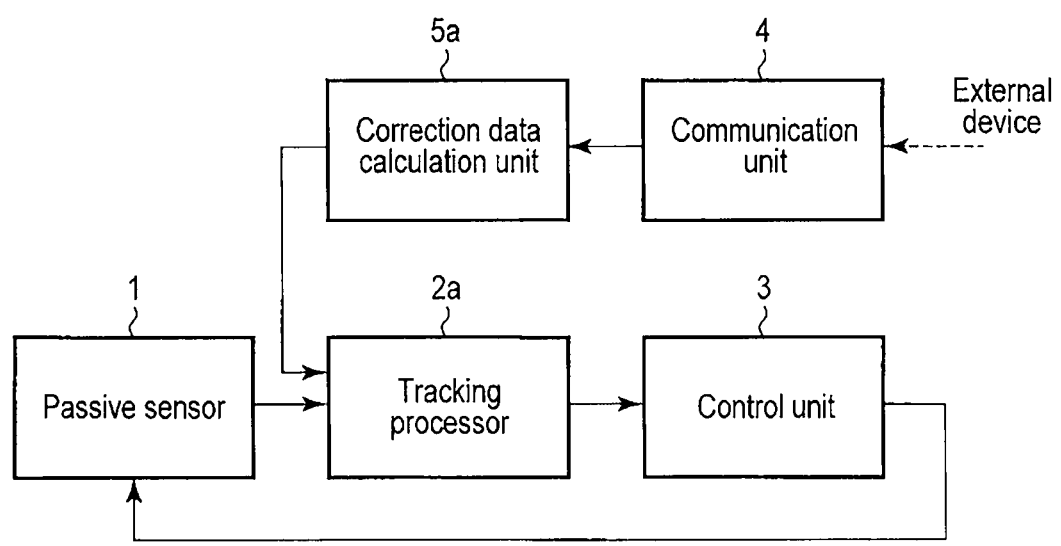
F I G. 1

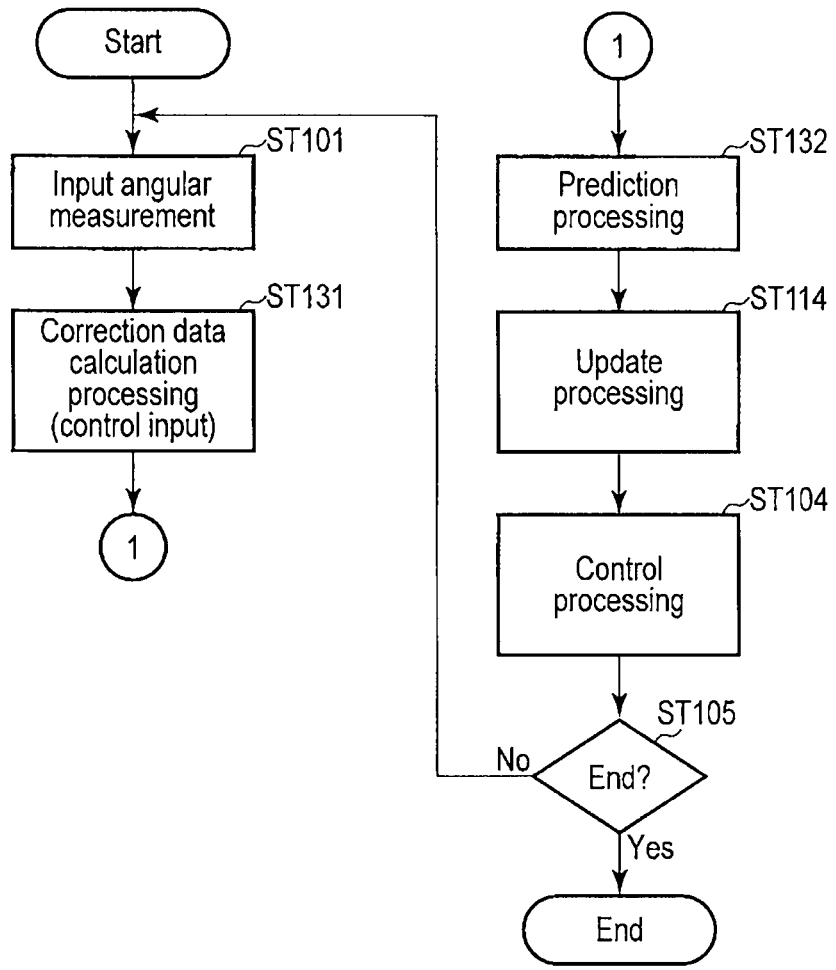
F I G. 4

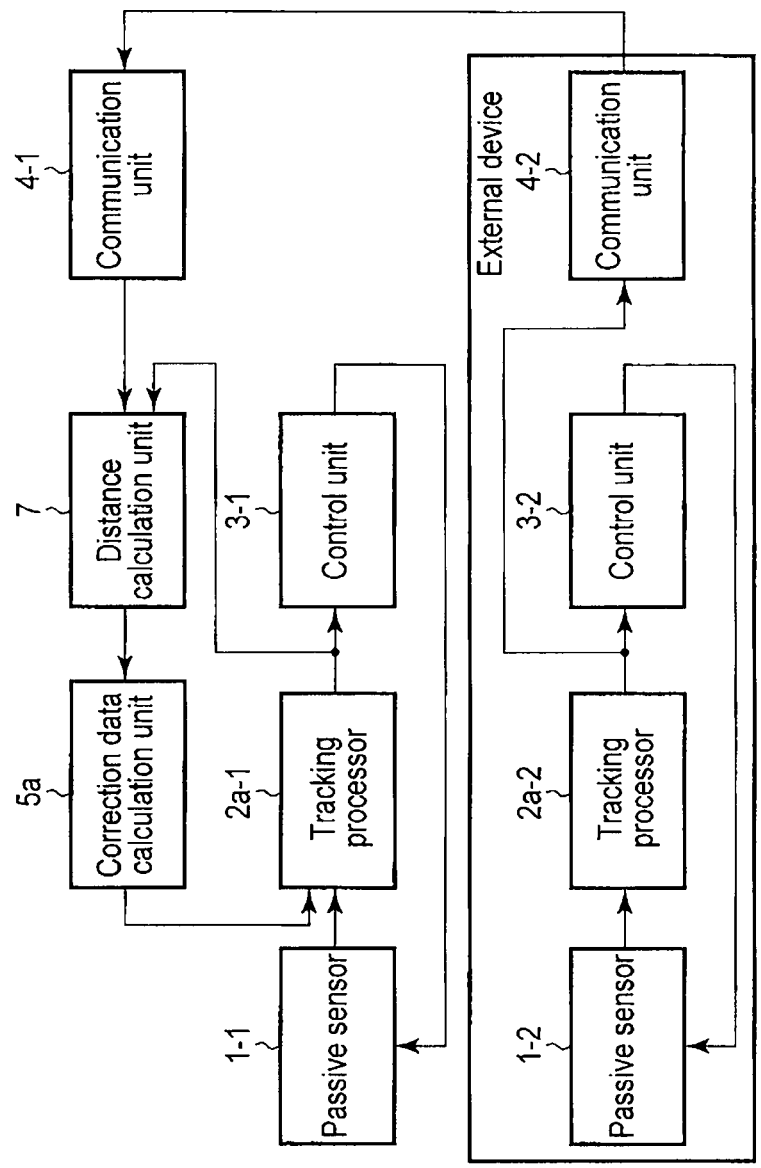
F I G. 10

TARGET TRACKING DEVICE AND TARGET TRACKING METHOD

CROSS-REFERENCE TO RELATED APPLICATIONS

This application is based upon and claims the benefit of priority from prior Japanese Patent Application No. 2011-040363, filed Feb. 25, 2011, the entire contents of which are incorporated herein by reference.

FIELD

Embodiments described herein relate generally to a target tracking device and a target tracking method which track a target using a passive sensor that measures the angle of the target to obtain angular measurement.

BACKGROUND

FIG. 8 is a block diagram showing an example of a conventional target tracking device. This target tracking device comprises a passive sensor 1, a tracking processor 2, and a control unit 3. The passive sensor 1 measures the angle of a radio wave, infrared rays, a sound wave, or the like radiated (and reradiated) from a target. That is, the passive sensor 1 measures the angle of the target, thereby obtaining angular measurement. The passive sensor 1 sends the angular measurement to the tracking processor 2.

The tracking processor 2 calculates a predicted state and an updated state based on the angular measurement from the passive sensor 1. The tracking processor 2 sends the predicted state and the updated state to the control unit 3 as the target track. Based on the target track from the tracking processor 2, the control unit 3 generates a control signal to control the posture and the like of the passive sensor 1, and sends the signal to the passive sensor 1.

FIG. 9 is a flowchart illustrating the procedure executed by the conventional target tracking device.

When target tracking processing starts, angular measurement is input to the tracking processor 2 (ST101). That is, the passive sensor 1 measures the target based on the control signal from the control unit 3, and sends the angular measurement of the target obtained by the measurement to the tracking processor 2. The tracking processor 2 acquires the angular measurement sent from the passive sensor 1.

Prediction processing is executed (ST102). That is, the tracking processor 2 calculates the predicted state of the target and its covariance matrix based on the updated state of the target and its covariance matrix calculated in step ST103 of the preceding measurement.

Update processing is then executed (ST103). That is, based on the angular measurement of the target from the passive sensor 1 and the predicted state of the target and its covariance matrix calculated in step ST102, the tracking processor 2 calculates the updated state of the target and its covariance matrix and sends them to the control unit 3 as the target track.

Control processing is executed (ST104). That is, based on the target track from the tracking processor 2, the control unit 3 generates a control signal to control the posture and the like of the passive sensor 1, and sends the signal to the passive sensor 1. The processing of steps ST101 to ST105 is continued until the end.

The processing contents of the tracking processor 2 will be described in detail. The motion model of the target is defined in the following way. Note that "bar x" will be expressed as "x(-)" hereinafter.

$$\bar{x}_{k+1} = F_{k+1}\bar{x}_k + G_{k+1}W_k \tag{1}$$

$$\bar{x}_k = [a_k \quad e_k \quad \dot{a}_k \quad \dot{e}_k]^T \tag{2}$$

$$F_{k+1} = \begin{bmatrix} I_2 & (t_{k+1}-t_k)\cdot I_2 \\ O_2 & I_2 \end{bmatrix} \tag{3}$$

$$G_{k+1} = \begin{bmatrix} \dfrac{(t_{k+1}-t_k)^2}{2} \cdot I_2 \\ (t_{k+1}-t_k)\cdot I_2 \end{bmatrix} \tag{4}$$

$$Q_k = \dfrac{1}{r_k}\begin{bmatrix} (\sigma_k^h)^2 & 0 \\ 0 & (\sigma_k^v)^2 \end{bmatrix} \tag{5}$$

where $x(-)_k$ is a state vector including an azimuth $a_k$, an elevation $e_k$, and their velocity components at an measurement time $t_k$, $F_{k+1}$ and $G_{k+1}$ are the transition matrix and the driving matrix from the measurement time $t_k$ to an measurement time $t_{k+1}$, respectively, $w_k$ is the process noise vector at the measurement time $t_k$ for an average 0 and a covariance matrix $Q_k$, $\sigma^h_k$ and $\sigma^v_k$ are the standard deviations of the horizontal and vertical planes of process noise at the measurement time $t_k$, respectively, $r_k$ is the distance from the passive sensor 1 to the target at the measurement time $t_k$, $A^T$ is the transposition of a vector or matrix A, $I_n$ is an n×n identity matrix, and $O_n$ is an n×n zero matrix.

The measurement model of the passive sensor 1 is defined by $$y_k = H_k \bar{x}_k + v_k \tag{6}$$

$$H_k = \begin{bmatrix} 1 & 0 & 0 & 0 \\ 0 & 1 & 0 & 0 \end{bmatrix} \tag{7}$$

$$R_k = \begin{bmatrix} (\sigma_k^a)^2 & 0 \\ 0 & (\sigma_k^e)^2 \end{bmatrix} \tag{8}$$

where $y_k$ is the measurement vector of the passive sensor 1 at the measurement time $t_k$, $H_k$ is the measurement matrix of the passive sensor 1 at the measurement time $t_k$, $v_k$ is the measurement noise vector of the passive sensor 1 at the measurement time $t_k$ for an average 0 and a covariance matrix $R_k$, and $\sigma^a_k$ and $\sigma^e_k$ are the standard deviations of the azimuth and elevation of measurement noise at the measurement time $t_k$, respectively.

In step ST101, the angular measurement from the passive sensor 1 is input as the measurement vector $y_k$.

In step ST102, prediction processing represented by the following equations is executed using the result of update processing of the preceding measurement. Note that "hat x" will be expressed as "x(^)" hereinafter.

$$\hat{x}_{k|k-1} = F_k \hat{x}_{k-1|k-1} \tag{9}$$

$$P_{k|k-1} = F_k P_{k-1|k-1}(F_k)^T + G_k Q_{k-1}(G_k)^T \tag{10}$$

$$Q_{k-1} = \dfrac{1}{r_{preset}}\begin{bmatrix} (\sigma_{k-1}^h)^2 & 0 \\ 0 & (\sigma_{k-1}^v)^2 \end{bmatrix} \tag{11}$$

where $x(^)_{k|k-1}$ and $P_{k|k-1}$ are the predicted state vector and the predicted error covariance matrix at the measurement time $t_k$, respectively, and $x(^)_{k-1|k-1}$ and $P_{k-1|k-1}$ are the updated state vector and the updated error covariance matrix at an measurement time $t_{k-1}$, respectively. Since a true value $r_{k-1}$ of the target distance cannot be known, a preset target distance $r_{preset}$ is used when calculating a process noise covariance matrix $Q_{k-1}$.

In step ST103, update processing represented by the following equations is executed using the measurement vector from the passive sensor 1 and the result of prediction processing. Note that "tilde y" will be expressed as "y(~)" hereinafter.

$$\tilde{y}_k = y_k - H_k \hat{x}_{k|k-1} \quad (12)$$

$$S_k = H_k P_{k|k-1} (H_k)^T + R_k \quad (13)$$

$$K_k = P_{k|k-1} (H_k)^T (S_k)^{-1} \quad (14)$$

$$\hat{x}_{k|k} = \hat{x}_{k|k-1} + K_k \tilde{y}_k \quad (15)$$

$$P_{k|k} = (I_4 - K_k H_k) P_{k|k-1} \quad (16)$$

where $y(\sim)_k$ is the residual vector of the passive sensor 1 at the measurement time $t_k$, $S_k$ is the residual covariance matrix of the passive sensor 1 at the measurement time $t_k$, $K_k$ is the Kalman gain matrix of the passive sensor 1 at the measurement time $t_k$, $x(\hat{\ })_{k|k}$ and $P_{k|k}$ are the updated state vector and the updated error covariance matrix at the measurement time $t_k$, respectively, and $A^{-1}$ is the inverse matrix of the matrix A.

As described above, in the tracking processing of the passive sensor 1, the process noise covariance matrix $Q_{k-1}$ includes an error because the distance data from the passive sensor 1 to the target is not available. It is consequently difficult to calculate the optimum value of the filter gain (Kalman gain matrix) that is indirectly calculated from the process noise covariance matrix and used to calculate the track. Hence, the track error of the target becomes large.

Even for a target that performs constant velocity (non-maneuver) on the orthogonal coordinate system, an angular acceleration and the differential component of the angular acceleration are generated on the polar coordinate system. Since it is difficult to estimate the component from angular measurement and reflect it on the process noise covariance matrix $Q_{k-1}$, the track error becomes large.

As a technique of improving the tracking performance for both a target that performs non-maneuver and a target that performs maneuver, an Interacting Multiple Model (IMM) filter is known, which operates a plurality of motion models in parallel. However, since many motion models are generally defined as a motion on a three-dimensional orthogonal coordinate system, it is difficult to apply the technique to the tracking processor 2 that estimates the target track on a two-dimensional polar coordinate system or the like.

As described above, in the target tracking device using a passive sensor, the distance data from the passive sensor 1 to the target is not obtained in general. It is therefore difficult to calculate the optimum value of the filter gain to be used to calculate the track, and the track error becomes large.

Since the distance data to the target cannot be obtained, the target is tracked on a local coordinate system about the passive sensor. However, when, for example, a polar coordinate system is used as the local coordinate system, an angular acceleration and the differential component of the angular acceleration are generated on the polar coordinate system even if the target performs constant velocity (non-maneuver) on the orthogonal coordinate system.

When the filter gain is increased to cope with the above-described problem, the random component of the track error becomes large. When the filter gain is decreased to make the random component of the track error smaller, the bias component of the track error becomes large. At any rate, it is difficult to improve the tracking performance.

When a technique assuming a single motion model is optimized for a target that performs non-maneuver, tracking performance for a target that performs maneuver degrades. Similarly, when the technique is optimized for a target that performs maneuver, tracking performance for a target that performs non-maneuver degrades. That is, it is difficult for the existing technique to improve the tracking performance for both a target that performs non-maneuver and a target that performs maneuver.

BRIEF DESCRIPTION OF THE DRAWINGS

FIG. 1 shows an exemplary block diagram of a target tracking device according to the first embodiment;

FIG. 4 is a flowchart illustrating the procedure executed by a target tracking device according to the third embodiment;

FIG. 10 is an exemplary block diagram of a target tracking device according to another embodiment.

DETAILED DESCRIPTION

In general, according to one embodiment, a target tracking device includes a track calculation unit and a correction unit. The track calculation unit calculates a track of a target based on angular measurement of the target measured by a passive sensor. The correction unit sends correction data to the track calculation unit. The correction unit calculates the correction data based on a state vector of the target. The track calculation unit calculates track for each of a plurality of motion models based on the angular measurement and the correction data. The track calculation unit calculates the track of the target based on the track for each of the motion models.

Figure 8:
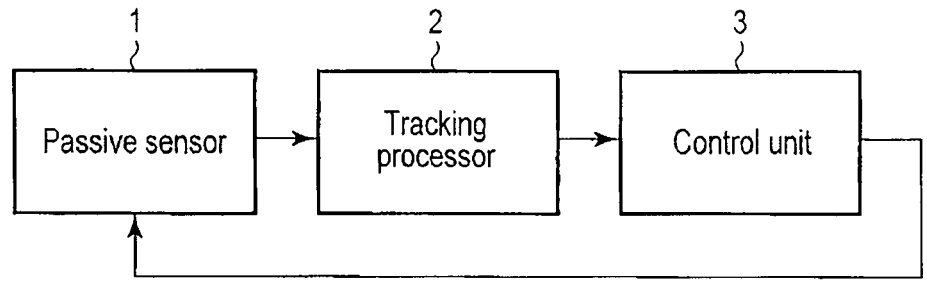
FIG. 8 is a block diagram showing an example a conventional target tracking device.
Figure 9:
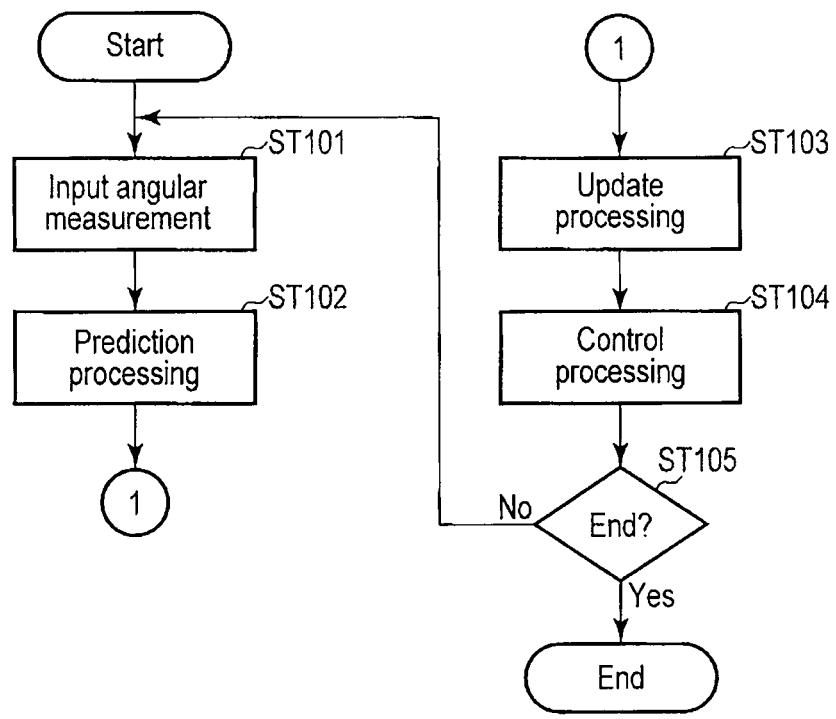
FIG. 9 is a flowchart illustrating the procedure executed by the conventional target tracking device.

The target tracking device according to an embodiment will now be described in detail with reference to the accompanying drawings. The same reference numerals as in FIG. 8 denote the common blocks in the following explanation. The common processing steps are indicated by the same step numbers in the flowcharts including FIG. 9.

First Embodiment

FIG. 1 shows an exemplary block diagram of a target tracking device according to the first embodiment. The target tracking device shown in FIG. 1 comprises a passive sensor 1, a tracking processor 2a, a control unit 3, a communication unit 4, and a correction data calculation unit 5a.

The passive sensor 1 measures the angle of a target and sends the obtained angular measurement to the tracking processor 2a. The communication unit 4 sends the state vector of the target input from an external device to the correction data calculation unit 5a. The correction data calculation unit 5a calculates correction data on a local coordinate system (polar coordinate system) about the passive sensor 1 based on the state vector of the target sent via the communication unit 4. The correction data calculation unit 5a calculates the target distance (the distance from the passive sensor 1 to the target) and sends it to the tracking processor 2a.

Note that a radar device, passive sensors performing stereo view or the like is usable as the external devices.

Based on the angular measurement from the passive sensor 1 and the correction data (target distance) from the correction data calculation unit 5a, the tracking processor 2a calculates a predicted state for each of a plurality of motion models and an updated state for each of the plurality of motion models. The tracking processor 2a also calculates an updated state by weighted sum of the updated states for the plurality of motion models, and sends the updated state to the control unit 3 as the target track. Based on the target track from the tracking processor 2a, the control unit 3 generates a control signal to control the posture and the like of the passive sensor 1 and sends the signal to the passive sensor 1. The functions of the target tracking device according to the first embodiment will be described next.

Figure 2:
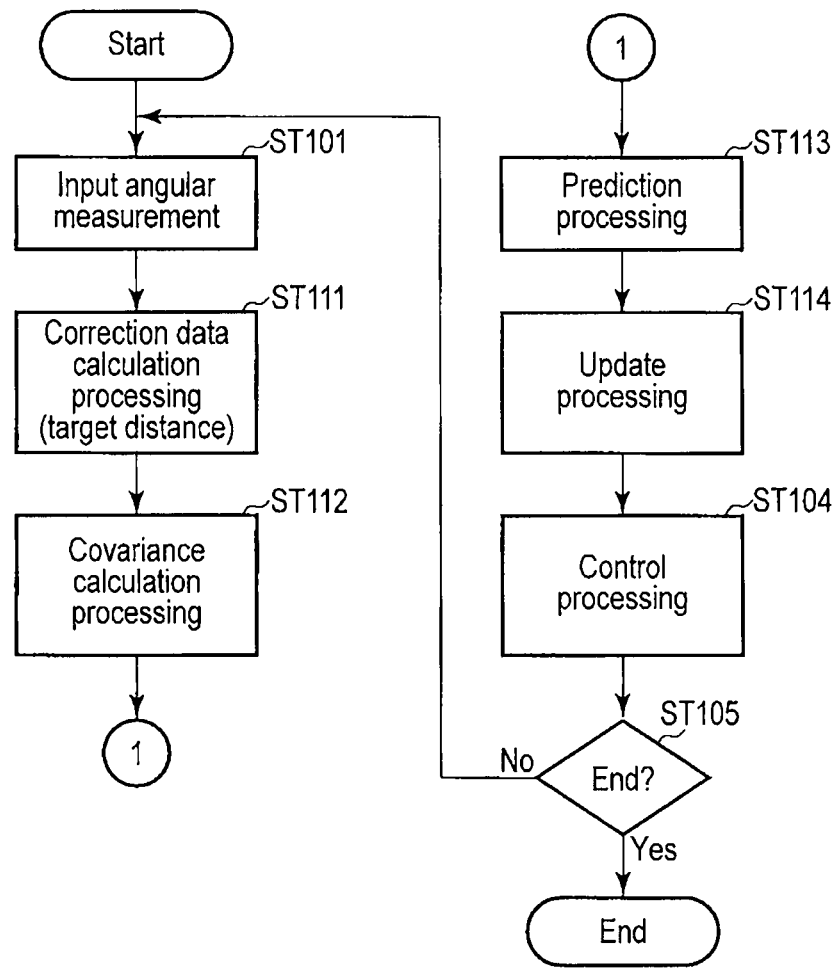
FIG. 2 is a flowchart illustrating the procedure of target tracking processing performed by the target tracking device according to the first embodiment.

FIG. 2 is a flowchart illustrating the procedure executed by the target tracking device according to the first embodiment. When tracking processing starts, angular measurement is input (ST101). That is, the passive sensor 1 measures the target based on the control signal from the control unit 3, and sends the angular measurement of the target to the tracking processor 2a. The tracking processor 2a acquires the angular measurement sent from the passive sensor 1.

Correction data calculation processing (target distance) is executed (ST111). That is, the correction data calculation unit 5a calculates distance data from the passive sensor 1 to the target based on the state vector of the target input from the external device. The correction data calculation unit 5a sends the distance data to the tracking processor 2a as the correction data (target distance). In the following explanation, the correction data is used to perform correction when calculating the target track based on the angular measurement from the passive sensor 1.

Covariance calculation processing is executed (ST112). That is, the tracking processor 2a calculates a process noise covariance matrix for each of the plurality of motion models based on the correction data (target distance) from the correction data calculation unit 5a.

Prediction processing is executed (ST113). That is, the predicted state of the target and its covariance matrix are calculated for each of the plurality of motion models based on the updated states of the target and their covariance matrices for the plurality of motion models and the process noise covariance matrices for the plurality of motion models.

The updated states of the target and their covariance matrices for the plurality of motion models are calculated in step ST114 of the preceding measurement. The process noise covariance matrices for the plurality of motion models are calculated in step ST112.

Update processing is then executed (ST114). That is, based on the angular measurement of the target from the passive sensor 1 and the predicted states of the target and their covariance matrices for the plurality of motion models, the tracking processor 2a calculates the updated state of the target and its covariance matrix for each of the plurality of motion models.

The tracking processor 2a also calculates the updated state of the target and its covariance matrix by weighted sum of the updated states of the target and their covariance matrices for the plurality of motion models. The calculated updated state and its covariance matrix are sent to the control unit 3 as the target track. The predicted states of the target and their covariance matrices for the plurality of motion models are calculated in step ST113.

Control processing is executed (ST104). That is, based on the target track from the tracking processor 2a, the control unit 3 generates a control signal to control the posture and the like of the passive sensor 1, and sends the signal to the passive sensor 1. It is then checked whether to end (ST105). Upon determining in step ST105 not to end, the process returns to step ST101 to repeat the above-described processing. On the other hand, upon determining in step ST105 to end, the target tracking processing ends.

The processing contents of the correction data calculation unit 5a and the tracking processor 2a will be described next in detail. The motion model of the target is defined by $$x_{k+1}^i = F_{k+1} x_k^i + G_{k+1} w_k^i \qquad (17)$$

$$x_k^i = [\begin{array}{cccc} a_k^i & e_k^i & \dot{a}_k^i & \dot{e}_k^i \end{array}]^T \qquad (18)$$

$$F_{k+1} = \begin{bmatrix} I_2 & (t_{k+1} - t_k) \cdot I_2 \\ O_2 & I_2 \end{bmatrix} \qquad (19)$$

$$G_{k+1} = \begin{bmatrix} \dfrac{(t_{k+1} - t_k)^2}{2} \cdot I_2 \\ (t_{k+1} - t_k) \cdot I_2 \end{bmatrix} \qquad (20)$$

$$Q_k^i = \dfrac{1}{r_k} \begin{bmatrix} (\sigma_k^{h,i})^2 & 0 \\ 0 & (\sigma_k^{v,i})^2 \end{bmatrix} \qquad (21)$$

where $x_k^i$ is a state vector corresponding to the ith motion model and including an azimuth $a_k^i$, an elevation $e_k^i$, and their velocity components at an measurement time $t_k$, $F_{k+1}$ and $G_{k+1}$ are the transition matrix and the driving matrix from the measurement time $t_k$ to an measurement time $t_{k+1}$, respectively, $w_k^i$ is the process noise vector corresponding to the ith motion model at the measurement time $t_k$ for an average 0 and a covariance matrix $Q_k^i$, $\sigma_k^{h,i}$ and $\sigma_k^{v,i}$ are the standard deviations of the horizontal and vertical planes of process noise corresponding to the ith motion model at the measurement time $t_k$, respectively, $r_k$ is the distance from the passive sensor 1 to the target at the measurement time $t_k$, $A^T$ is the transposition of a vector or matrix A, $I_n$ is an n×n identity matrix, and $O_n$ is an n×n zero matrix.

The measurement model of the passive sensor 1 is defined by $$y_k = H_k x_k^t + v_k \qquad (22)$$

$$H_k = \begin{bmatrix} 1 & 0 & 0 & 0 \\ 0 & 1 & 0 & 0 \end{bmatrix} \qquad (23)$$

$$R_k = \begin{bmatrix} (\sigma_k^a)^2 & 0 \\ 0 & (\sigma_k^e)^2 \end{bmatrix} \qquad (24)$$

where $y_k$ is the measurement vector of the passive sensor 1 at the measurement time $t_k$, $x_k^t$ is the true state vector at the measurement time $t_k$, $H_k$ is the measurement matrix of the passive sensor 1 at the measurement time $t_k$, $v_k$ is the measurement noise vector of the passive sensor 1 at the measurement time $t_k$ for an average 0 and a covariance matrix $R_k$, and $\sigma^a_k$ and $\sigma^e_k$ are the standard deviations of the azimuth and elevation of measurement noise at the measurement time $t_k$, respectively.

In step ST101, the angular measurement from the passive sensor 1 is input to the tracking processor 2a as the measurement vector $y_k$.

In step ST111, the correction data calculation unit 5a calculates a target distance $r(\hat{\ })_{k-1}$ as correction data based on the state vector of the target input from the external device.

$$\hat{r}_{k-1} = \sqrt{(x_{k-1}-x_0)^2+(y_{k-1}-y_0)^2+(z_{k-1}-z_0)^2} \quad (25)$$

where $x_{k-1}$, $y_{k-1}$, and $z_{k-1}$ are x-, y-, and z-components at the position of the state vector of the target at an measurement time $t_{k-1}$, and x0, y0, and z0 are x-, y-, and z-components at the position of the passive sensor 1.

Note that a radar device or the like is usable as the external devices. The target distance may be directly measured using a distance measurement device such as a laser ranging device arranged at almost the same position as the passive sensor 1.

In step ST112, the tracking processor 2a calculates a process noise covariance matrix $Q^i_{k-1}$ corresponding to the ith motion model based on the correction data (target distance) from the correction data calculation unit 5a.

$$Q^i_{k-1} = \frac{1}{\hat{r}_{k-1}} \begin{bmatrix} (\sigma^{h,i}_{k-1})^2 & 0 \\ 0 & (\sigma^{v,i}_{k-1})^2 \end{bmatrix} \quad (26)$$

In step ST113, the tracking processor 2a executes, using the result of update processing of the preceding measurement and the process noise covariance matrix $Q^i_{k-1}$ corresponding to the ith motion model obtained by equation (26) in step ST112, prediction processing represented by $$\hat{x}_{k|k-1}^i = F_k \hat{x}_{k-1|k-1}^i \quad (27)$$

$$P_{k|k-1}^i = F_k P_{k-1|k-1}^i (F_k)^T + G_k Q_{k-1}^i (G_k)^T \quad (28)$$

where $x(\hat{\ })^i_{k|k-1}$ and $p^i_{k|k-1}$ are the predicted state vector and the predicted error covariance matrix corresponding to the ith motion model at the measurement time $t_k$, respectively, and $x(\hat{\ })^i_{k-1|k-1}$ and $p^i_{k-1|k-1}$ are the updated state vector and the updated error covariance matrix corresponding to the ith motion model at the measurement time $t_{k-1}$, respectively.

In step ST114, the tracking processor 2a executes, using the measurement vector from the passive sensor 1 and the result of prediction processing, update processing represented by $$\tilde{y}_k^i = y_k - H_k \hat{x}_{k|k-1}^i \quad (29)$$

$$S_k^i = H_k P_{k|k-1}^i (H_k)^T + R_k \quad (30)$$

$$K_k^i = P_{k|k-1}^i (H_k)^T (S_k^i)^{-1} \quad (31)$$

$$\hat{x}_{k|k}^i = \hat{x}_{k|k-1}^i + K_k^i \tilde{y}_k^i \quad (32)$$

$$P_{k|k}^i = (I_4 - K_k^i H_k) P_{k|k-1}^i \quad (33)$$

$$p_k^i = \frac{l_k^i p_{k-1}^i}{\sum_{j=1}^{n} l_k^j p_{k-1}^j} \quad (34)$$

$$\hat{x}_{k|k} = \sum_{i=1}^{n} p_k^i \hat{x}_{k|k}^i \quad (35)$$

$$P_{k|k} = \sum_{i=1}^{n} p_k^i \left( P_{k|k}^i + (\hat{x}_{k|k}^i - \hat{x}_{k|k})(\hat{x}_{k|k}^i - \hat{x}_{k|k})^T \right) \quad (36)$$

where $y(\sim)^i_k$ is the residual vector of the passive sensor 1 corresponding to the ith motion model at the measurement time $t_k$, $S^i_k$ is the residual covariance matrix of the passive sensor 1 corresponding to the ith motion model at the measurement time $t_k$, $K^i_k$ is the Kalman gain matrix of the passive sensor 1 corresponding to the ith motion model at the measurement time $t_k$, $x(\hat{\ })^i_{k|k}$ and $P^i_{k|k}$ are the updated state vector and the updated error covariance matrix corresponding to the ith motion model at the measurement time $t_k$, respectively, $p^i_k$ is the motion model probability corresponding to the ith motion model at the measurement time $t_k$, $l^i_k$ us the motion model likelihood corresponding to the ith motion model at the measurement time $t_k$, $x(\hat{\ })_{k|k}$ and $P_{k|k}$ are the updated state vector and updated error covariance matrix at the measurement time $t_k$ which are obtained by weighted sum of the plurality of motion models, and $A^{-1}$ is the inverse matrix of the matrix A.

As described above, according to the target tracking device of the first embodiment, the correction data calculation unit 5a calculates correction data (target distance) based on the state vector of the target input from the external device. The tracking processor 2a calculates the process noise covariance matrix for each of the plurality of motion models based on the correction data (target distance) from the correction data calculation unit 5a. The tracking processor 2a uses, for track calculation, a filter gain (Kalman gain matrix) indirectly calculated from the value of the process noise covariance matrix. It is therefore possible to reduce the track error (random component) of a target that performs non-maneuver and the track error (bias component) of a target that performs maneuver.

Note that although in the above description, a constant velocity model is used as the motion model of the target, the above-described processing is also applicable to another motion model such as a constant acceleration model. The tracking processor 2a may execute IMM filter processing or the like.

In the above-described example, the state vector of the target of the tracking processor 2a is represented on the polar coordinate system. Instead, the position (the horizontal and vertical coordinates and the velocity) of the target on a camera image or the like may be used.

In the target tracking device according to the first embodiment, the correction data calculation unit 5a calculates the target distance as the correction data. The tracking processor 2a calculates the process noise covariance matrix for each of the plurality of motion models based on the correction data (target distance). Instead, the correction data calculation unit 5a may calculate the process noise covariance matrix for each of the plurality of motion models as the correction data. The tracking processor 2a may calculate the filter gain based on the correction data (process noise covariance matrix for each of the plurality of motion models).

Second Embodiment

In a target tracking device according to the second embodiment, the functions of the correction data calculation unit 5a and the tracking processor 2a shown in FIG. 1 are slightly different from those of the first embodiment. In the second embodiment, reference numeral 5b denotes a correction data calculation unit; and 2b, a tracking processor. Only parts different from the target tracking device according to the first embodiment will be explained below.

The correction data calculation unit 5b calculates correction data on a local coordinate system (polar coordinate system) about a passive sensor 1 based on the state vector of a target sent from a communication unit 4. In the second embodiment, the target distance (distance from the passive sensor 1 to the target) and the process noise covariance matrix of the target are used as the correction data.

Based on angular measurement from the passive sensor 1 and the correction data (target distance and process noise covariance matrix) from the correction data calculation unit 5b, the tracking processor 2b calculates a predicted state for each of a plurality of motion models and an updated state for each of the plurality of motion models. The tracking processor 2b also calculates an updated state by weighted sum of the updated states for the plurality of motion models, and sends the updated state to a control unit 3 as the target track. The functions of the target tracking device according to the second embodiment will be described next.

Figure 3:
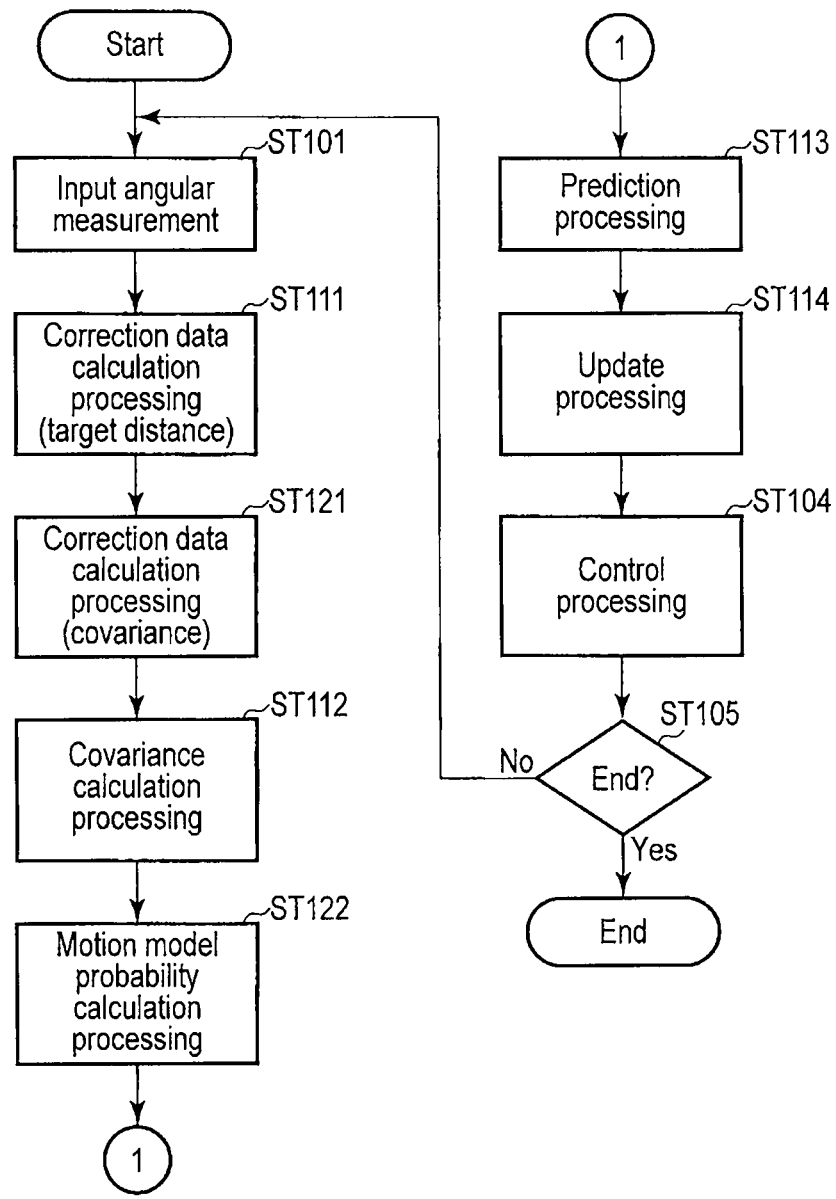
FIG. 3 is a flowchart illustrating the procedure executed by a target tracking device according to the second embodiment.

FIG. 3 is a flowchart illustrating the procedure executed by the target tracking device according to the second embodiment. When tracking processing starts, angular measurement is input (ST101). That is, the passive sensor 1 measures the target based on a control signal from the control unit 3, and sends the angular measurement of the target to the tracking processor 2b. The tracking processor 2b acquires the angular measurement sent from the passive sensor 1.

Correction data calculation processing (target distance) is executed (ST111). That is, the correction data calculation unit 5b calculates distance data from the passive sensor 1 to the target based on the state vector of the target input from the external device. The correction data calculation unit 5b sends the distance data to the tracking processor 2b as the correction data (target distance).

Correction data calculation processing (covariance) is executed (ST121). That is, the correction data calculation unit 5b calculates the process noise covariance matrix of the target based on the state vector of the target input from the external device. The process noise covariance matrix is sent to the tracking processor 2b as the correction data.

Note that as the external device, a device having a function of estimating the process noise covariance matrix of the target is applicable. Examples of a device of this type are a radar device including an adaptive Kalman filter and a radar device including an IMM filter.

Covariance calculation processing is executed (ST112). That is, the tracking processor 2b calculates a process noise covariance matrix for each of the plurality of motion models based on the correction data (target distance) from the correction data calculation unit 5b.

Motion model probability calculation processing is then executed (ST122). That is, the tracking processor 2b calculates a motion model probability for each of the plurality of motion models based on the correction data (process noise covariance matrix) from the correction data calculation unit 5b.

Prediction processing is executed (ST113). That is, the tracking processor 2b calculates the predicted state of the target and its covariance matrix for each of the plurality of motion models based on the updated states of the target and their covariance matrices for the plurality of motion models and the process noise covariance matrices for the plurality of motion models. The updated states of the target and their covariance matrices for the plurality of motion models are calculated in step ST114 of the preceding measurement. The process noise covariance matrices for the plurality of motion models are calculated in step ST112.

Update processing is then executed (ST114). That is, based on the angular measurement of the target from the passive sensor 1 and the predicted states of the target and their covariance matrices for the plurality of motion models, the tracking processor 2b calculates the updated state of the target and its covariance matrix for each of the plurality of motion models. The predicted states of the target and their covariance matrices for the plurality of motion models are calculated in step ST113.

The tracking processor 2b also calculates the updated state of the target and its covariance matrix by weighted sum of the updated states of the target and their covariance matrix. These values are sent to the control unit 3 as the target track.

Control processing is executed (ST104). That is, based on the target track from the tracking processor 2b, the control unit 3 generates a control signal to control the posture and the like of the passive sensor 1. The control signal is sent to the passive sensor 1. The processing of steps ST101 to ST105 is continued until the end.

The processing contents of the correction data calculation unit 5b and the tracking processor 2b will be described next in detail with reference to FIG. 3. The motion model of the target and the measurement model of the passive sensor 1 are the same as in the first embodiment. Referring to FIG. 3, the processing contents of steps ST101, ST111, ST112, ST113, ST104, and ST105 are the same as in the first embodiment.

In step ST121, based on the state vector of the target (including a process noise covariance matrix $Q^a_{k-1}$) input from the external device, a process noise covariance matrix $Q_{k-1}$ viewed from the passive sensor 1 is calculated as correction data by $$Q_{k-1} = T_{k-1} Q^a_{k-1} (T_{k-1})^T = \begin{bmatrix} V^{aa}_{k-1} & V^{ae}_{k-1} \\ V^{ae}_{k-1} & V^{ee}_{k-1} \end{bmatrix} \quad (37)$$

When the process noise covariance matrix $Q^a_{k-1}$ input from the external device is given by $$Q^a_{k-1} = \begin{bmatrix} V^{xx}_{k-1} & V^{xy}_{k-1} & V^{xz}_{k-1} \\ V^{xy}_{k-1} & V^{yy}_{k-1} & V^{yz}_{k-1} \\ V^{xz}_{k-1} & V^{yz}_{k-1} & V^{zz}_{k-1} \end{bmatrix} \quad (38)$$

a transformation matrix $T_{k-1}$ is given by $$T_{k-1} = \frac{\partial(a_{k-1}, e_{k-1})}{\partial(x_{k-1}, y_{k-1}, z_{k-1})} = \begin{bmatrix} \frac{\partial a_{k-1}}{\partial x_{k-1}} & \frac{\partial a_{k-1}}{\partial y_{k-1}} & \frac{\partial a_{k-1}}{\partial z_{k-1}} \\ \frac{\partial e_{k-1}}{\partial x_{k-1}} & \frac{\partial e_{k-1}}{\partial y_{k-1}} & \frac{\partial e_{k-1}}{\partial z_{k-1}} \end{bmatrix} \quad (39)$$

Note that $(x_{k-1}, y_{k-1}, z_{k-1})$ and $(a_{k-1}, e_{k-1})$ are values obtained by converting the state vector of the target input from the external device into the position vector (orthogonal coordinate system and polar coordinate system) of the target viewed from the passive sensor 1.

In step ST122, using the process noise covariance matrix $Q_{k-1}$ and a process noise covariance matrix $Q^i_{k-1}$ corresponding to the ith motion model, the tracking processor 2b calculates a motion model probability $p^i_{k-1}$ corresponding to the ith motion model and satisfying $$Q_{k-1} \approx \sum_{i=1}^{n} p^i_{k-1} Q^i_{k-1} \\ \sum_{i=1}^{n} p^i_{k-1} = 1 \Bigg\} \quad (40)$$

The process noise covariance matrix $Q_{k-1}$ is calculated in step ST121. The process noise covariance matrix $Q^i_{k-1}$ corresponding to the ith motion model is calculated in step ST112.

Note that if the defined (set) motion model does not strictly apply to the actual motion model, the process noise covariance matrix $Q^i_{k-1}$ corresponding to the ith motion model can be corrected in consideration of the error component in modeling.

In step ST114, update processing is executed using the motion model probability $p^i_{k-1}$ corresponding to the ith motion model, which is calculated by equation (40) in step ST122 in place of equation (34) of update processing of the preceding measurement (step ST114).

As described above, according to the target tracking device of the second embodiment, the correction data calculation unit 5b calculates correction data (target distance and process noise covariance matrix) based on the state vector of the target input from the external device. The tracking processor 2b uses, for track calculation, a filter gain (Kalman gain matrix) indirectly calculated from the correction data (target distance) sent from the correction data calculation unit 5b for each of the plurality of motion models.

It is therefore possible to reduce the track error (random component) of a target that performs non-maneuver and the track error (bias component) of a target that performs maneuver.

Additionally, the tracking processor 2b uses, for track calculation, the motion model probability indirectly calculated from the correction data (process noise covariance matrix) for each of the plurality of motion models. This allows to reduce the track error at initial tracking stage when the number of times of measurement is small. Also, this allows to reduce the track error for both the target that performs non-maneuver and the target that performs maneuver even when the motion model of the target has changed after the preceding measurement.

Third Embodiment

In a target tracking device according to the third embodiment, the functions of the correction data calculation unit 5a and the tracking processor 2a shown in FIG. 1 are slightly different from those of the first embodiment. In the third embodiment, reference numeral 5c denotes a correction data calculation unit; and 2c, a tracking processor. Only parts different from the target tracking device according to the first embodiment will be explained below.

The correction data calculation unit 5c calculates correction data on a local coordinate system (polar coordinate system) about a passive sensor 1 based on the state vector of a target sent via a communication unit 4. In the third embodiment, the angular acceleration of the target, which is generated when the constant velocity model on the polar coordinate system defined (set) by equation (17) does not strictly apply to the constant velocity model on the orthogonal coordinate system, is regarded as a control input vector. The correction data is sent to the tracking processor 2c.

Based on angular measurement from the passive sensor 1 and the correction data (control input vector) from the correction data calculation unit 5c, the tracking processor 2c calculates a predicted state for each of a plurality of motion models and an updated state for each of the plurality of motion models. The tracking processor 2c also calculates an updated state by weighted sum of the updated states for the plurality of motion models, and sends the updated state to a control unit 3 as the target track. The functions of the target tracking device according to the third embodiment will be described next.

FIG. 4 is a flowchart illustrating the procedure executed by the target tracking device according to the third embodiment. Note that only processing procedures different from those of the first or second embodiment will be explained below.

When tracking processing starts, angular measurement is input (ST101). That is, the passive sensor 1 measures the target based on a control signal from the control unit 3, and sends the angular measurement of the target to the tracking processor 2c. The tracking processor 2c acquires the angular measurement sent from the passive sensor 1.

Correction data calculation processing (control input) is executed (ST131). That is, the correction data calculation unit 5c calculates the control input vector of the target based on the state vector of the target input from the external device. The correction data calculation unit 5c sends the control input vector to the tracking processor 2c as the correction data.

Prediction processing is executed (ST132). That is, the tracking processor 2c calculates the predicted state of the target and its covariance matrix for each of the plurality of motion models based on the updated states of the target and their covariance matrices for the plurality of motion models and the correction data (control input vector) from the correction data calculation unit 5c. The updated states of the target and their covariance matrices for the plurality of motion models are calculated in step ST114 of the preceding measurement.

Update processing is then executed (ST114). That is, based on the angular measurement of the target from the passive sensor 1 and the predicted states of the target and their covariance matrices for the plurality of motion models, the tracking processor 2c calculates the updated state of the target and its covariance matrix for each of the plurality of motion models. The predicted states of the target and their covariance matrices for the plurality of motion models are calculated in step ST132. The tracking processor 2c also calculates the updated state of the target and its covariance matrix by weighted sum of the updated states of the target and their covariance matrix for the plurality of motion models. The updated state of the target and its covariance matrix are sent to the control unit 3 as the target track.

Control processing is executed (ST104). That is, based on the target track from the tracking processor 2c, the control unit 3 generates a control signal to control the posture and the like of the passive sensor 1 and sends the signal to the passive sensor 1. The processing of steps ST101 to ST105 is continued until the end.

The processing contents of the correction data calculation unit 5c and the tracking processor 2c will be described next in detail. The motion model of the target is defined by $$x_{k+1}^i = F_{k+1} x_k^i + G_{k+1} u_k + G_{k+1} w_k^i \quad (41)$$

$$x_k^i = [\, a_k^i \quad e_k^i \quad \dot{a}_k^i \quad \dot{e}_k^i \,]^T \quad (42)$$

$$u_k = [\, \ddot{a}_k \quad \ddot{e}_k \,]^T \quad (43)$$

$$F_{k+1} = \begin{bmatrix} I_2 & (t_{k+1} - t_k) \cdot I_2 \\ O_2 & I_2 \end{bmatrix} \quad (44)$$

$$G_{k+1} = \begin{bmatrix} \dfrac{(t_{k+1} - t_k)^2}{2} \cdot I_2 \\ (t_{k+1} - t_k) \cdot I_2 \end{bmatrix} \quad (45)$$

$$Q_k^i = \dfrac{1}{r_k} \begin{bmatrix} (\sigma_k^{h,i})^2 & 0 \\ 0 & (\sigma_k^{v,i})^2 \end{bmatrix} \quad (46)$$

where $x_k^i$ is a state vector corresponding to the ith motion model and including an azimuth $a_k^i$, an elevation $e_k^i$, and their velocity components at an measurement time $t_k$, $u_k$ is the control input vector including the acceleration components of an azimuth $a_k$ and an elevation $e_k$ at the measurement time $t_k$, $F_{k+1}$ and $G_{k+1}$ are the transition matrix and the driving matrix from the measurement time $t_k$ to an measurement time $t_{k+1}$, respectively, $w_k^i$ is the process noise vector corresponding to the ith motion model at the measurement time $t_k$ for an average 0 and a covariance matrix $Q_k^i$, $\sigma_k^{h,i}$ and $\sigma_k^{v,i}$ are the standard deviations of the horizontal and vertical planes of process noise corresponding to the ith motion model at the measurement time $t_k$, respectively, $r_k$ is the distance from the passive sensor 1 to the target at the measurement time $t_k$, $A^T$ is the transposition of a vector or matrix A, $I_n$ is an n×n identity matrix, and $O_n$ is an n×n zero matrix.

The measurement model of the passive sensor 1 is the same as in the first embodiment. The processing contents of steps ST101, ST114, ST104, and ST105 are also the same as in the first embodiment.

In step ST131, based on the state vector of the target input from the external device, the correction data calculation unit 5c calculates a control input vector (angular acceleration) $u_{k-1}$ as correction data by $$u_{k-1} = [\ddot{a}_{k-1} \ddot{e}_{k-1}]^T \quad (47)$$

Note that the control input vector (angular acceleration) $u_{k-1}$ can be calculated by $$u_{k-1} = \dfrac{\partial(\dot{a}_{k-1}, \dot{e}_{k-1})}{\partial(x_{k-1}, y_{k-1}, z_{k-1})} [\dot{x}_{k-1} \quad \dot{y}_{k-1} \quad \dot{z}_{k-1}]^T \quad (48)$$

$$= \begin{bmatrix} \dfrac{\partial \dot{a}_{k-1}}{\partial x_{k-1}} & \dfrac{\partial \dot{a}_{k-1}}{\partial y_{k-1}} & \dfrac{\partial \dot{a}_{k-1}}{\partial z_{k-1}} \\ \dfrac{\partial \dot{e}_{k-1}}{\partial x_{k-1}} & \dfrac{\partial \dot{e}_{k-1}}{\partial y_{k-1}} & \dfrac{\partial \dot{e}_{k-1}}{\partial z_{k-1}} \end{bmatrix} \begin{bmatrix} \dot{x}_{k-1} \\ \dot{y}_{k-1} \\ \dot{z}_{k-1} \end{bmatrix}$$

where $(x_{k-1}, y_{k-1}, z_{k-1})$, $(\dot{x}(\bullet)_{k-1}, \dot{y}(\bullet)_{k-1}, \dot{z}(\bullet)_{k-1})$, and $(\dot{a}(\bullet)_{k-}, \dot{e}(\bullet)_{k-1})$ are vectors obtained by coordinate-converting the state vector of the target input from the external device into the position vector, the velocity vector, and the angular velocity vector of the target viewed from the passive sensor 1.

In step ST132, using the result of update processing of the preceding measurement and the control input vector $u_{k-1}$, the tracking processor 2c executes prediction processing represented by $$\hat{x}_{k|k-1}^i = F_k \hat{x}_{k-1|k-1}^i + G_k u_{k-1} \quad (49)$$

$$P_{k|k-1}^i = F_k P_{k-1|k-1}^i (F_k)^T + G_k Q_{k-1}^i (G_k)^T \quad (50)$$

$$Q_{k-1}^i = \dfrac{1}{r_{preset}} \begin{bmatrix} (\sigma_{k-1}^{h,i})^2 & 0 \\ 0 & (\sigma_{k-1}^{v,i})^2 \end{bmatrix} \quad (51)$$

Since a true value $r_{k-1}$ of the target distance cannot be known, a preset target distance $r_{preset}$ is used when calculating a process noise covariance matrix $Q_{k-1}^i$ corresponding to the ith motion model.

As described above, according to the target tracking device of the third embodiment, the correction data calculation unit 5c calculates correction data (control input vector) based on the state vector of the target input from the external device. The correction data is sent to the tracking processor 2c.

The tracking processor 2c uses, for track calculation, a predicted state indirectly calculated from the correction data (control input vector) from the correction data calculation unit 5c for each of the plurality of motion models. It is therefore possible to reduce the track error (bias component) for a target that performs non-maneuver and a target that performs maneuver.

Note that although in the above description, a constant velocity model is used as the motion model of the target, the above-described processing is also applicable to another motion model such as a constant acceleration model. The control input vector $u_{k-1}$ is assumed to be constant independently of the motion model. Instead, the algorithm may be configured such that the control input vector $u_{k-1}$ takes a different value or differential order (for example, angular jerk (i.e. the rate of change of acceleration)) for each motion model. The tracking processor 2c may execute IMM filter processing or the like.

Fourth Embodiment

In a target tracking device according to the fourth embodiment, the functions of the correction data calculation unit 5a and the tracking processor 2a shown in FIG. 1 are slightly different from those of the first embodiment. In the fourth embodiment, reference numeral 5d denotes a correction data calculation unit; and 2d, a tracking processor. Only parts different from the target tracking device according to the first embodiment will be explained below.

The correction data calculation unit 5d calculates correction data on a local coordinate system (polar coordinate system) about a passive sensor 1 based on the state vector of a target sent from a communication unit 4. In the fourth embodiment, the target distance (distance from the passive sensor 1 to the target) and the control input vector are used as correction data.

Based on angular measurement from the passive sensor 1 and the correction data (target distance and control input vector) from the correction data calculation unit 5d, the tracking processor 2d calculates a predicted state for each of a plurality of motion models and updated state for each of the plurality of motion models. The tracking processor 2d also calculates an updated state by weighted sum of the updated states for the plurality of motion models, and sends the updated state to a control unit 3 as the target track. The functions of the target tracking device according to the fourth embodiment will be described next.

Figure 5:
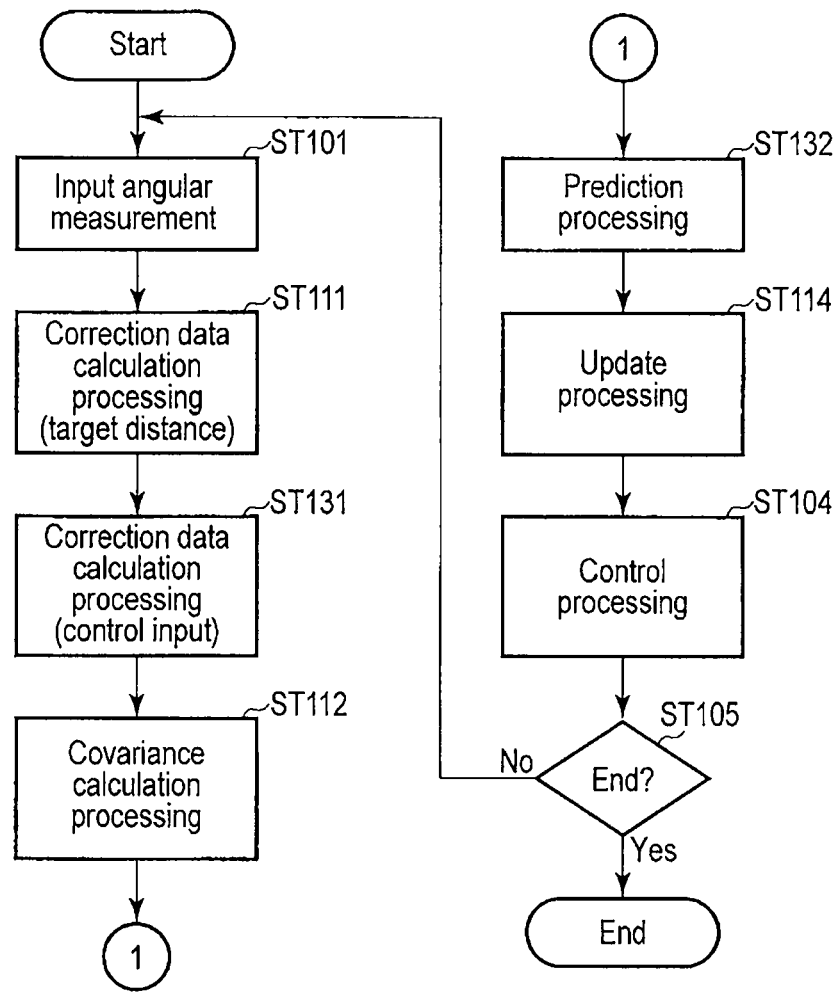
FIG. 5 is a flowchart illustrating the procedure executed by a target tracking device according to the fourth embodiment.

FIG. 5 is a flowchart illustrating the procedure executed by the target tracking device according to the fourth embodiment. Note that only processing procedures different from those of the first to third embodiments will be explained below.

When tracking processing starts, angular measurement is input (ST101). That is, the passive sensor 1 measures the target based on a control signal from the control unit 3, and sends the angular measurement of the target to the tracking processor 2d. The tracking processor 2d acquires the angular measurement sent from the passive sensor 1.

Correction data calculation processing (target distance) is executed (ST111). That is, the correction data calculation unit 5d calculates the distance from the passive sensor 1 to the target based on the state vector of the target input from the external device, and sends the calculated value to the tracking processor 2d as the correction data (target distance).

Correction data calculation processing (control input) is executed (ST131). That is, the correction data calculation unit 5d calculates the control input vector of the target based on the state vector of the target input from the external device, and sends the control input vector to the tracking processor 2d as the correction data (control input vector).

Covariance calculation processing is executed (ST112). That is, the tracking processor 2d calculates a process noise covariance matrix for each of the plurality of motion models based on the correction data (target distance) from the correction data calculation unit 5d.

Prediction processing is executed (ST132). That is, the tracking processor 2d calculates the predicted state of the target and its covariance matrix for each of the plurality of motion models based on the updated states of the target and their covariance matrices for the plurality of motion models and the correction data (target distance and control input vector) from the correction data calculation unit 5d. The updated states of the target and their covariance matrices for the plurality of motion models are calculated in step ST114 of the preceding measurement.

Update processing is then executed (ST114). That is, based on the angular measurement of the target from the passive sensor 1 and the predicted states of the target and their covariance matrices for the plurality of motion models, the tracking processor 2d calculates the updated state of the target and its covariance matrix for each of the plurality of motion models. The tracking processor 2d also calculates the updated state of the target and its covariance matrix by weighted sum of the updated states of the target and their covariance matrix for the plurality of motion models. The updated state of the target and its covariance matrix are sent to the control unit 3 as the target track. The predicted states of the target and their covariance matrices for the plurality of motion models are calculated in step ST132.

Control processing is executed (ST104). That is, based on the target track from the tracking processor 2d, the control unit 3 generates a control signal to control the posture and the like of the passive sensor 1 and sends the signal to the passive sensor 1. The processing of steps ST101 to ST105 is continued until the end.

The processing contents of the correction data calculation unit 5d and the tracking processor 2d will be described next in detail. The motion model of the target is the same as in the third embodiment. The measurement model of the passive sensor 1 is the same as in the first embodiment. The processing contents of steps ST101, ST111, ST112, ST114, ST104, and ST105 are the same as in the first embodiment. The processing contents of step ST131 are the same as in the third embodiment.

In step ST132, the tracking processor 2d executes prediction processing using a process noise covariance matrix $Q^i_{k-1}$ corresponding to the ith motion model obtained by equation (26) in step ST112 in place of equation (51).

As described above, according to the target tracking device of the fourth embodiment, the correction data calculation unit 5d calculates correction data (target distance and control input vector) based on the state vector of the target input from the external device. The tracking processor 2d uses, for track calculation, a predicted state and a filter gain (Kalman gain matrix) indirectly calculated from the correction data (target distance and control input vector) from the correction data calculation unit 5d for each of the plurality of motion models. It is therefore possible to reduce the track error (random component and bias component) of a target that performs non-maneuver and the track error (bias component) of a target that performs maneuver.

Fifth Embodiment

In a target tracking device according to the fifth embodiment, the functions of the correction data calculation unit 5a and the tracking processor 2a shown in FIG. 1 are slightly different from those of the first embodiment. In the fifth embodiment, reference numeral 5e denotes a correction data calculation unit; and 2e, a tracking processor. Only parts different from the target tracking device according to the first embodiment will be explained below.

The correction data calculation unit 5e calculates correction data on a local coordinate system (polar coordinate system) about a passive sensor 1 based on the state vector of a target sent via a communication unit 4. In the fifth embodiment, the correction data calculation unit 5e calculates the target distance (distance from the passive sensor 1 to the target), the process noise covariance matrix of the target, and the control input vector as the correction data. The correction data is sent to the tracking processor 2e.

Based on angular measurement from the passive sensor 1 and the correction data (target distance, process noise covariance matrix, and control input vector) from the correction data calculation unit 5e, the tracking processor 2e calculates predicted state for each of a plurality of motion models and updated state for each of the plurality of motion models. The tracking processor 2e also calculates an updated state by weighted sum of the updated states for the plurality of motion models, and sends the updated state to a control unit 3 as the target track. The functions of the target tracking device according to the fifth embodiment will be described next.

Figure 6:
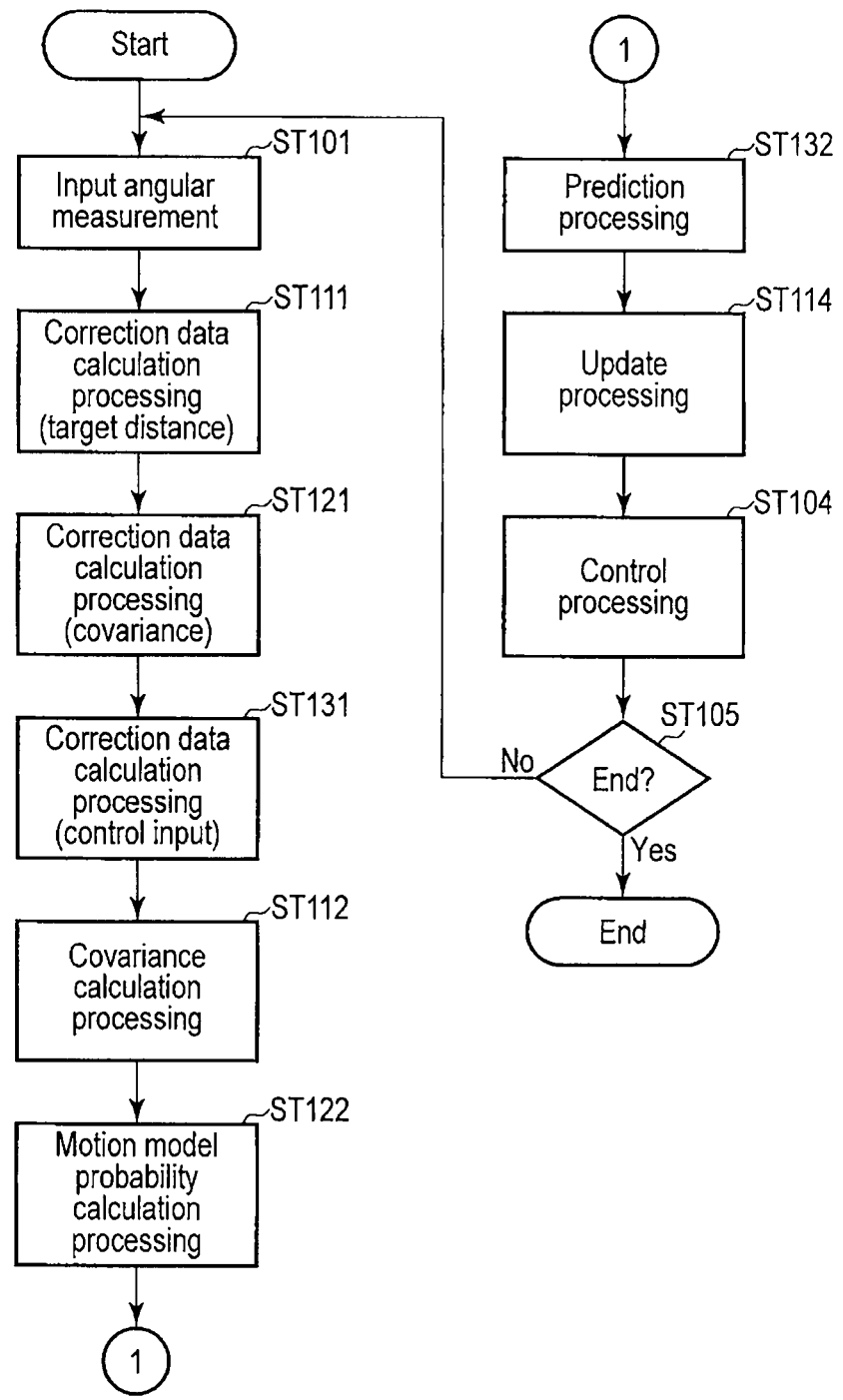
FIG. 6 is a flowchart illustrating the procedure executed by a target tracking device according to the fifth embodiment.

FIG. 6 is a flowchart illustrating the procedure executed by the target tracking device according to the fifth embodiment. Note that only processing procedures different from those of the first to fourth embodiments will be explained below.

When tracking processing starts, angular measurement is input (ST101). That is, the passive sensor 1 measures the target based on a control signal from the control unit 3, and sends the angular measurement of the target to the tracking processor 2e. The tracking processor 2e acquires the angular measurement sent from the passive sensor 1.

Correction data calculation processing (target distance) is executed (ST111). That is, the correction data calculation unit 5e calculates distance data from the passive sensor 1 to the target based on the state vector of the target input from the external device. The correction data calculation unit 5e sends the distance data to the tracking processor 2e as the correction data (target distance).

Correction data calculation processing (covariance) is executed (ST121). That is, the correction data calculation unit 5e calculates the process noise covariance matrix of the target based on the state vector of the target input from the external device. The process noise covariance matrix is sent to the tracking processor 2e as the correction data (process noise covariance matrix). Note that as the external device, for example, a radar device including an adaptive Kalman filter or an IMM filter capable of estimating the process noise covariance matrix of the target is usable.

Correction data calculation processing (control input) is executed (ST131). That is, the correction data calculation unit 5e calculates the control input vector of the target based on the state vector of the target input from the external device. The control input vector is sent to the tracking processor 2e as the correction data (control input vector).

Covariance calculation processing is executed (ST112). That is, the tracking processor 2e calculates a process noise covariance matrix for each of the plurality of motion models based on the correction data (target distance) from the correction data calculation unit 5e.

Motion model probability calculation processing is then executed (ST122). That is, the tracking processor 2e calculates a motion model probability for each of the plurality of motion models based on the correction data (process noise covariance matrix) from the correction data calculation unit 5e.

Prediction processing is executed (ST132). That is, the tracking processor 2e calculates the predicted state of the target and its covariance matrix for each of the plurality of motion models based on the updated states of the target and their covariance matrices for the plurality of motion models and the correction data (target distance and control input vector) from the correction data calculation unit 5e. The updated states of the target and their covariance matrices for the plurality of motion models are calculated in step ST114 of the preceding measurement.

Update processing is then executed (ST114). That is, based on the angular measurement of the target from the passive sensor 1 and the predicted states of the target and their covariance matrices for the plurality of motion models, the tracking processor 2e calculates the updated state of the target and its covariance matrix for each of the plurality of motion models. The tracking processor 2e also calculates the updated state of the target and its covariance matrix by weighted sum of the updated states and their covariance matrix. The updated state of the target and its covariance matrix are sent to the control unit 3 as the target track.

Control processing is executed (ST104). That is, based on the target track from the tracking processor 2e, the control unit 3 generates a control signal to control the posture and the like of the passive sensor 1. The control signal is sent to the passive sensor 1. The processing of steps ST101 to ST105 is continued until the end.

The processing contents of the correction data calculation unit 5e and the tracking processor 2e will be described next in detail. The motion model of the target is the same as in the third embodiment. The measurement model of the passive sensor 1 is the same as in the first embodiment. The processing contents of steps ST101, ST111, ST112, ST104, and ST105 are the same as in the first embodiment. The processing contents of steps ST121 and ST122 are the same as in the second embodiment. The processing contents of steps ST131 and ST132 are the same as in the third embodiment.

In step ST114, the tracking processor 2e executes update processing using a motion model probability $p^i_{k-1}$ corresponding to the ith motion model, which is calculated by equation (40) in step ST122 in place of equation (34) of update processing of the preceding measurement (step ST114).

As described above, according to the target tracking device of the fifth embodiment, the correction data calculation unit 5e calculates correction data (target distance, process noise covariance matrix, and control input vector) based on the state vector of the target input from the external device, and sends the correction data to the tracking processor 2e. The tracking processor 2e uses, for track calculation, a predicted state and a filter gain (Kalman gain matrix) indirectly calculated from the correction data (target distance and control input vector) from the correction data calculation unit 5e for each of the plurality of motion models. This makes it possible to reduce the track error (random component and bias component) of a target that performs non-maneuver and the track error (bias component) of a target that performs maneuver.

Additionally, the tracking processor 2e uses, for track calculation, the motion model probability indirectly calculated from the correction data (process noise covariance matrix) for each of the plurality of motion models. This allows to reduce the track error for both a target that performs non-maneuver and a target that performs maneuver at initial tracking stage when the number of times of measurement is small. Also, this allows to reduce the track error for both the target that performs non-maneuver and the target that performs maneuver even when the motion model of the target has changed after the preceding measurement.

Modified Embodiment

Figure 7A:
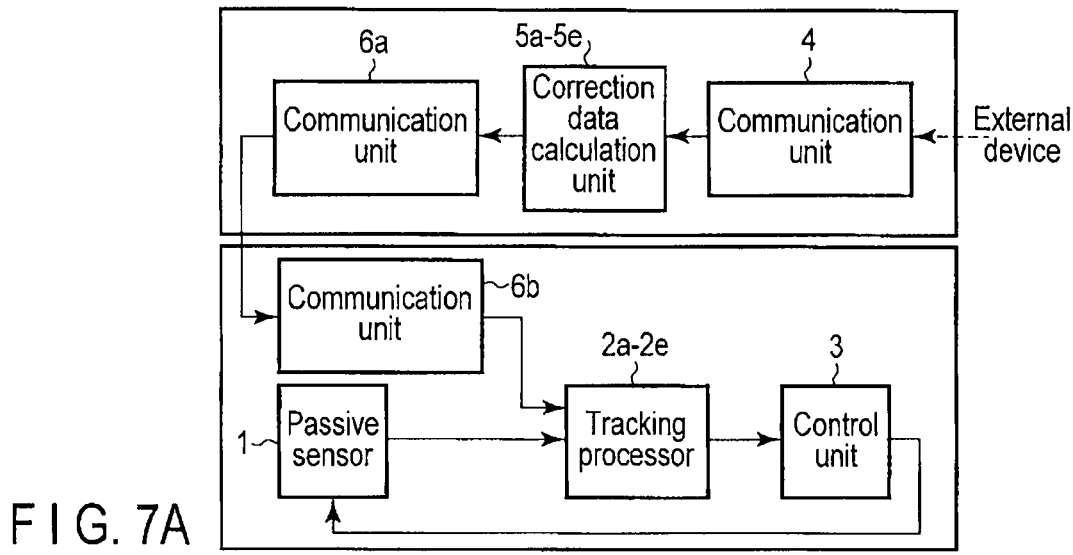
FIGS. 7A, 7B, and 7C shows exemplary block diagrams of target tracking devices according to modifications of the first to fifth embodiments.
Figure 7B:
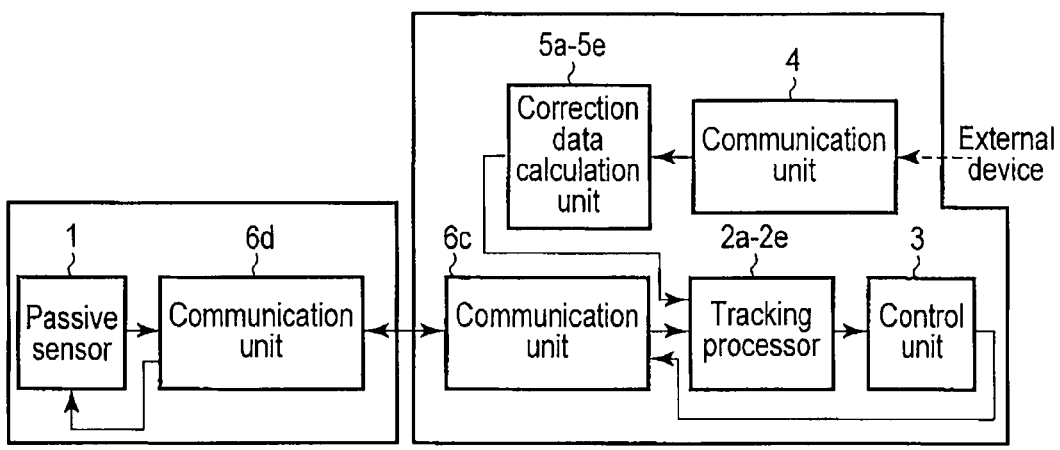
Figure 7C:
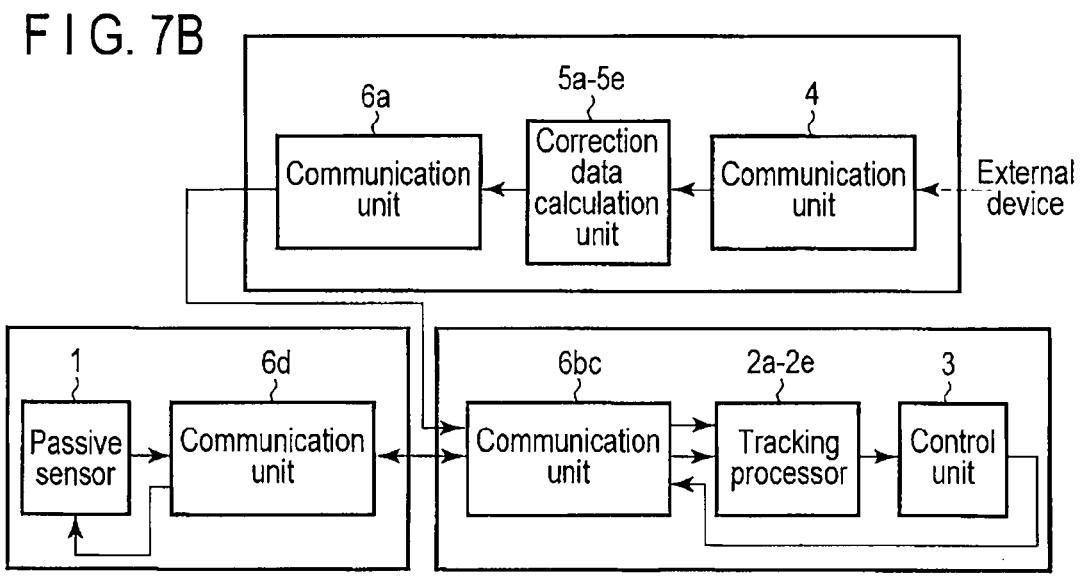

The target tracking devices according to the first to fifth embodiments can be modified as shown in FIGS. 7A, 7B, and 7C. A target tracking device shown in FIG. 7A comprises communication units 6a and 6b between the correction data calculation units 5a to 5e and the tracking processors 2a to 2e. The block including the correction data calculation units 5a to 5e and the block including the tracking processors 2a to 2e are thus separated.

A target tracking device shown in FIG. 7B comprises communication units 6c and 6d between the passive sensor 1 and the tracking processors 2a to 2e. The block including the passive sensor 1 and the block including the tracking processors 2a to 2e are thus separated.

A target tracking device shown in FIG. 1C comprises communication units 6a and 6bc between the correction data calculation units 5a to 5e and the tracking processors 2a to 2e. In addition, the target tracking device comprises the communication unit 6d between the communication unit 6bc and the passive sensor 1. The block including the correction data calculation units 5a to 5e, the block including the passive sensor 1, and the block including the tracking processors 2a to 2e are thus separated.

In any of the modifications, the same effects as described in the first to fifth embodiments can be obtained.

As described above, according to each of the above-described embodiments, it is possible to obtain a target tracking device having improved tracking performance for both a target that performs non-maneuver and a target that performs maneuver.

Another Embodiment

FIG. 10 is a block diagram showing an example of a target tracking device according to another embodiment. The target tracking device shown in FIG. 10 comprises a plurality of systems of target tracking devices each including a passive sensor. That is, the target tracking device shown in FIG. 10 uses a passive sensor as the external device described in the first to fifth embodiments.

One processing system including one passive sensor calculates one target track. Using two processing systems allows to calculate two target tracks that are independent of each other. As is known, the target distance can be calculated based on the principle of triangulation using the pair of target tracks. Another embodiment utilizes this fact. The technique of this type is sometimes called "stereo view".

The target tracking device shown in FIG. 10 comprises a main system, a subsystem, a distance calculation unit 7, and a correction data calculation unit 5a. The distance calculation unit 7 calculates distance data from target tracks individually calculated by the main system and the subsystem. The correction data calculation unit 5a calculates correction data based on the data given by the distance calculation unit 7.

The main system comprises a passive sensor 1-1, a tracking processor 2a-1, and a control unit 3-1. The subsystem comprises a passive sensor 1-2, a tracking processor 2a-2, and a control unit 3-2. The main system and the subsystem are connected via communication units 4-1 and 4-2. The target track calculated by the tracking processor 2a-2 of the subsystem is sent to the distance calculation unit 7 via the communication units 4-1 and 4-2. The target track calculated by the tracking processor 2a-1 of the main system is also sent to the distance calculation unit 7.

The distance calculation unit 7 calculates distance data to the target under the principle of triangulation based on the target track calculated by the tracking processor 2a-1 of the main system and that calculated by the tracking processor 2a-2 of the subsystem. The distance calculation unit 7 also calculates state vector of the target based on the target track calculated by the tracking processor 2a-1 and the distance data to the target. The state vector is sent to the correction data calculation unit 5a and used to calculate correction data. When calculating correction data based on the state vector, for example, the method described in the first embodiment is usable.

According to another embodiment, it is possible to calculate the target distance without using an external device for directly measuring the target distance. Hence, the target tracking device of another embodiment is especially suitably applicable to consumer appliances.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A target tracking device comprising:
a track calculation unit configured to calculate a track of a target based on angular measurement of the target measured by a passive sensor; and
a correction unit configured to send correction data to the track calculation unit,
wherein the correction unit calculates the correction data based on a state vector of the target input from an external device, and
the track calculation unit
calculates track for each of a plurality of motion models based on the angular measurement and the correction data, and
calculates the track of the target based on the track for each of the motion models, and
calculates the track of the target by weighted sum of all tracks for the motion models.

2. The target tracking device of claim 1, wherein
the correction unit
calculates distance data from the passive sensor to the target based on the state vector of the target, and
sends the distance data to the track calculation unit, and
the track calculation unit
calculates a process noise covariance matrix for each of the motion models based on the distance data, and
calculates the track for each of the motion models based on the process noise covariance matrix for each of the motion models.

3. The target tracking device of claim 1, wherein
the correction unit
calculates distance data from the passive sensor to the target based on the state vector of the target including a process noise covariance matrix,
calculates process noise covariance matrix of the target at a position of the passive sensor based on the state vector of the target including the process noise covariance matrix, and
sends the distance data and the process noise covariance matrix to the track calculation unit, and
the track calculation unit
calculates a process noise covariance matrix and a motion model probability for each of the motion models based on the distance data and the process noise covariance matrix, and
calculates the track of the target based on the process noise covariance matrix and the motion model probability for each of the motion models.

4. The target tracking device of claim 1, wherein
the correction unit
calculates control input vector of the target at a position of the passive sensor based on the state vector of the target, and
sends the control input vector to the track calculation unit, and
the track calculation unit
calculates a predicted state of the target for each of the motion models based on the control input vector, and
calculates the track of the target based on the predicted state for each of the motion models.

5. The target tracking device of claim 1, wherein
the correction unit
calculates control input vector of the target at a position of the passive sensor based on the state vector of the target, and
calculates distance data from the passive sensor to the target based on the state vector of the target, and
the track calculation unit
calculates a predicted state of the target for each of the motion models based on the control input vector,
calculates a process noise covariance matrix of the target for each of the motion models based on the distance data, and
calculates the track of the target based on the predicted state and the process noise covariance matrix for each of the motion models.

6. The target tracking device of claim 1, wherein
the correction unit
calculates control input vector of the target at a position of the passive sensor based on the state vector of the target including a process noise covariance matrix,
calculates distance data from the passive sensor to the target based on the state vector of the target including the process noise covariance matrix, and
calculates process noise covariance matrix of the target at the position of the passive sensor based on the state vector of the target including the process noise covariance matrix, and
the track calculation unit
calculates a predicted state of the target for each of the motion models based on the control input vector of the target,
calculates a process noise covariance matrix and a motion model probability of the target for each of the motion models based on the distance data and the process noise covariance matrix, and
calculates the track of the target based on the predicted state, the process noise covariance matrix, and the motion model probability for each of the motion models.

7. A target tracking method applied to a target tracking device, wherein the device includes:
a track calculation unit configured to calculate a track of a target based on angular measurement of the target measured by a passive sensor, and
a correction unit configured to send correction data to the track calculation unit,
wherein the method comprising:
calculating, by the correction unit, the correction data based on a state vector of the target input from an external device,
calculating, by the track calculation unit, track for each of a plurality of motion models based on the angular measurement and the correction data,
calculating, by the track calculation unit, the track of the target based on the track for each of the motion models, and
calculating, by the track calculation unit, the track of the target by weighted sum of all tracks for the motion models.

8. The target tracking method of claim 7, wherein
the calculating the correction data includes calculating distance data from the passive sensor to the target based on the state vector of the target,
the calculating the correction data includes sending the distance data to the track calculation unit,
the calculating the track includes calculating a process noise covariance matrix for each of the motion models based on the distance data, and
the calculating the track includes calculating the track for each of the motion models based on the process noise covariance matrix for each of the motion models.

9. The target tracking method of claim 7, wherein
the calculating the correction data includes calculating distance data from the passive sensor to the target based on the state vector of the target including a process noise covariance matrix,
the calculating the correction data includes calculating process noise covariance matrix of the target at a position of the passive sensor based on the state vector of the target including the process noise covariance matrix,
the calculating the correction data includes sending the distance data and the process noise covariance matrix to the track calculation unit,
the calculating the track includes calculating a process noise covariance matrix and a motion model probability for each of the motion models based on the distance data and the process noise covariance matrix, and
the calculating the track includes calculating the track of the target based on the process noise covariance matrix and the motion model probability for each of the motion models.

10. The target tracking method of claim 7, wherein
the calculating the correction data includes calculating control input vector of the target at a position of the passive sensor based on the state vector of the target,
the calculating the correction data includes sending the control input vector to the track calculation unit,
the calculating the track includes calculating a predicted state of the target for each of the motion models based on the control input vector, and
the calculating the track includes calculating the track of the target based on the predicted state for each of the motion models.

11. The target tracking method of claim 7, wherein
the calculating the correction data includes calculating control input vector of the target at a position of the passive sensor based on the state vector of the target,
the calculating the correction data includes calculating distance data from the passive sensor to the target based on the state vector of the target,
the calculating the track includes calculating a predicted state of the target for each of the motion models based on the control input vector,
the calculating the track includes calculating a process noise covariance matrix of the target for each of the motion models based on the distance data, and
the calculating the track includes calculating the track of the target based on the predicted state and the process noise covariance matrix for each of the motion models.

12. The target tracking method of claim 7, wherein
the calculating the correction data includes calculating control input vector of the target at a position of the passive sensor based on the state vector of the target including a process noise covariance matrix,
the calculating the correction data includes calculating distance data from the passive sensor to the target based on the state vector of the target including the process noise covariance matrix,
the calculating the correction data includes calculating process noise covariance matrix of the target at the position of the passive sensor based on the state vector of the target including the process noise covariance matrix,
the calculating the track includes calculating a predicted state of the target for each of the motion models based on the control input vector of the target,
the calculating the track includes calculating a process noise covariance matrix and a motion model probability of the target for each of the motion models based on the distance data and the process noise covariance matrix, and
the calculating the track includes calculating the track of the target based on the predicted state, the process noise covariance matrix, and the motion model probability for each of the motion models.

13. A target tracking device comprising:
a first passive sensor;
a first track calculation unit configured to calculate a track of a target based on angular measurement of the target measured by the first passive sensor;

a correction unit configured to send correction data to the first track calculation unit;

a second passive sensor;

a second track calculation unit configured to calculate the track of the target based on angular measurement of the target measured by the second passive sensor; and a distance calculation unit configured to calculate distance data of the target based on the track of the target calculated by the first track calculation unit and the track of the target calculated by the second track calculation unit, and calculate state vector of the target based on the track of the target calculated by the first track calculation unit and the distance data of the target, wherein the correction unit calculates the correction data based on the state vector, and the first track calculation unit calculates track for each of a plurality of motion models based on the angular measurement measured by the first passive sensor and the correction data, and calculates the track of the target based on the track for each of the motion models.

14. A target tracking method applied to a target tracking device, wherein the device includes:

a first passive sensor;

a first track calculation unit configured to calculate a track of a target based on angular measurement of the target measured by the first passive sensor;

a correction unit configured to send correction data to the first track calculation unit;

a second passive sensor;

a second track calculation unit configured to calculate the track of the target based on angular measurement of the target measured by the second passive sensor; and a distance calculation unit configured to calculate distance data of the target based on the track of the target calculated by the first track calculation unit and the track of the target calculated by the second track calculation unit, and calculate state vector of the target based on the track of the target calculated by the first track calculation unit and the distance data of the target, wherein the method comprising:

calculating, by the correction unit, the correction data based on the state vector, calculating, by the first track calculation unit, track for each of a plurality of motion models based on the angular measurement measured by the first passive sensor and the correction data, and calculating, by the first track calculation unit, the track of the target based on the track for each of the motion models.

* * * * *